United States Patent [19]

Van Dewoestine

[11] E Patent Number: Re. 33,077

[45] Reissued Date of Patent: Oct. 3, 1989

[54] WOOD BURNING STOVE

[75] Inventor: Robert V. Van Dewoestine, Caton, N.Y.

[73] Assignee: Corning Glass Works, Corning, N.Y.

[21] Appl. No.: 696,650

[22] Filed: Jan. 30, 1985

Related U.S. Patent Documents

Reissue of:

[64] Patent No.: 4,373,452
Issued: Feb. 15, 1983
Appl. No.: 353,834
Filed: Mar. 1, 1982

U.S. Applications:

[63] Continuation-in-part of Ser. No. 173,155, Jul. 28, 1980.

[51] Int. Cl.[4] ..... F23J 15/00

[52] U.S. Cl. ..... 110/203; 110/210; 422/177; 422/200

[58] Field of Search ..... 110/203, 210, 345; 422/200, 177; 126/77

[56] References Cited

U.S. PATENT DOCUMENTS

| | | | |
|---|---|---|---|
| 2,658,742 | 11/1953 | Suter et al. | 263/3 |
| 2,742,437 | 4/1956 | Houdry | 252/455 |
| 2,845,882 | 8/1958 | Bratton | 110/8 |
| 2,846,557 | 8/1958 | Schulze et al. | 219/35 |
| 2,905,523 | 9/1959 | Houdry et al. | 23/2 |
| 2,922,018 | 1/1960 | Walkoe | 219/35 |
| 3,043,245 | 7/1962 | Hebert et al. | 110/8 |
| 3,110,300 | 11/1963 | Brown et al. | 126/109 |
| 3,208,131 | 9/1965 | Ruff et al. | 29/157 |
| 3,290,483 | 12/1966 | Hurko | 217/393 |
| 3,428,434 | 2/1969 | Hurko | 23/288 |
| 3,444,925 | 5/1969 | Johnson | 165/166 |
| 3,486,841 | 12/1969 | Betz | 422/177 X |
| 3,565,830 | 2/1971 | Keith et al. | 252/466 |
| 3,607,133 | 9/1971 | Hirao et al. | 23/288 F |
| 3,611,954 | 10/1971 | Monroe, Jr. | 110/210 X |
| 3,785,778 | 1/1974 | Burstein et al. | 23/288 F |
| 3,832,122 | 8/1974 | LeHaye et al. | 431/10 |
| 3,905,917 | 9/1975 | Nishino et al. | 252/455 |
| 3,914,090 | 10/1975 | Pfefferle | 431/9 |
| 3,928,961 | 12/1975 | Pfefferle | 431/7 X |
| 4,054,418 | 10/1977 | Miller et al. | 110/203 X |
| 4,103,735 | 8/1978 | Warner | 165/39 |
| 4,154,568 | 5/1979 | Kendall et al. | 431/7 |
| 4,180,052 | 12/1979 | Henderson | 126/108 |
| 4,211,672 | 7/1980 | Sonetaka et al. | 252/455 |
| 4,225,561 | 9/1980 | Torres | 422/177 X |
| 4,249,509 | 2/1981 | Syme | 126/77 |
| 4,279,629 | 7/1981 | Simms | 55/307 |

FOREIGN PATENT DOCUMENTS

| | | |
|---|---|---|
| 2003045B | 6/1682 | United Kingdom . |
| 411655 | 6/1934 | United Kingdom . |
| 1369055 | 10/1974 | United Kingdom . |
| 1521010 | 8/1978 | United Kingdom . |
| 2003045A | 3/1979 | United Kingdom . |
| 1584998 | 2/1981 | United Kingdom . |

OTHER PUBLICATIONS

Franklin Industries, Inc. brochure entitled "Concorde Catalytic Wood Stoves and Fireplace Insert," (1981 Copyright).

"Wood Stoves/Fireplace Inserts" 2-page brochure by Franklin Industries (1981 Copyright).

"Scandia After-Burn 2000" brochure by Franklin Cast Products, Inc., Div. of Franklin Industries (1980 Copyright).

(List continued on next page.)

*Primary Examiner*—Edward G. Favors
*Attorney, Agent, or Firm*—Foley & Lardner

[57] ABSTRACT

Disclosed herein is an improved wood burning stove having a combustion chamber and a flue for removing exhaust from the chamber wherein the improvement comprises the addition of a catalytic converter means for oxidizing oxidizable species in the exhaust. In one embodiment, the catalytic converter means is situated in a flue immediately adjacent the combustion chamber. In another embodiment, the catalytic converter means is situated in the combustion chamber itself. In addition the nature and structure of a catalytic converter means have been determined for marginal acceptable and optimum performance with adequate pressure drop thereacross.

26 Claims, 3 Drawing Sheets

OTHER PUBLICATIONS

"Concorde Catalytic" brochure by Franklin Cast Products, Inc. (1980 Copyright).

Photographs (9) taken at New Orleans Trade Show (Feb., 1981) showing a variety of stoves and retrofit catalytic converter kits.

Proceedings: Third Workshop on Catalytic Combustion (Asheville, NC, Oct. 1978)/Interagency Energy/Environment R&D Program Report.

Jun. 6, 1977, Memo from W. A. Boyer Re Visit to Acurex Corporation.

Mar. 4, 1976, Letter to Acurex Corporation from Barry S. Bissell.

08/20/80, Corning Order Confirmation.

12/05/84, Corning Glass Works Memorandum, R. V. Van Dewoestine.

09/25/80, Corning Glass Works Press Release.

10/01/80, Corning Glass Works Press Release.

10/31/80, Corning Glass Works Press Release.

Corning Wood Stove Folder distributed 2/21-24/81.

2/21-24/81, Article "Catalytically Assisted Combustion in Residential Wood, Fuel and Heating Appliances", by J. W. Shelton.

11/23/83, Letter from C. J. Lewis to R. N. Wardell.

02/23/81, Article "Catalytic Combustion and Residential Wood Stove", by Van Dewoestine et al.

"The Effect of Catalytic Combustion on Creosote Reduction, Combustion Efficiency, and Pollution Abatement for Residential Wood Heaters", by Frank Zimar, Robert V. Van Dewoestine and Roger A. Allaire of the Research & Development Div. of Corning Glass Works.

National Technical Report, vol. 25, No. 5, entitled "Catalyst 'Pnanpuel' for Home Environment Conservation (Home Use)", by Atsushi Nishino, Toshio Okubo, Kazunori Sonetaka and Kunio Kimura (Oct. 1979).

Corning CELCOR ® Cellular Ceramics Brochure.

08/08/84, Corning Glass Works Memorandum, W. A. Boyer and attachments.

11/27/78, Corning Glass Works Memorandum, H. A. Lowenstein and attachments.

08/07/80, Corning Glass Works Quotation.

WOOD BURNING STOVE

Matter enclosed in heavy brackets [ ] appears in the original patent but forms no part of this reissue specification; matter printed in italics indicates the additions made by reissue.

CROSS-REFERENCE TO RELATED APPLICATIONS

This is a continuation-in-part of application Ser. No. 173,155 filed Jul. 28, 1980.

Copending application Ser. No. 136,687 filed Apr. 2, 1980 by P. S. Albertsen (which is now assigned to the assignee of the present invention) discloses a bypass damper system for minimizing back pressure during loading of a wood burning stove employing a catalytic converter and self-cleaning glass windows in the combustion chamber access door(s) of such stove.

The copending application Ser. No. 173,156, filed July 28, 1980, of Allaire and Van Dewoestine (which is assigned to the assignee of the present invention) discloses one mounting means for a catalytic converter in a wood burning stove which minimizes back pressure during loading.

The copending application Ser. No. 173,157, filed July 28, 1980, of Allaire et al. (which is assigned to the assignee of the present invention) discloses another mounting arrangement for a catalytic converter means in a wood burning stove which minimizes back pressure during loading.

BACKGROUND OF THE INVENTION

This invention relates, in general, to an improvement in wood burning stoves and, in particular, it relates to a method and apparatus for increasing the efficiency and safety of wood burning stoves.

Due to the relative scarcity and high cost of petroleum products, wood burning stoves have been increasingly employed for home heating and other purposes. A reasonably air tight wood burning stove is far more efficient than a home fireplace, which may result, in fact, in a net energy loss. However, wood burning stoves presently being utilized suffer from three significant drawbacks. First, wood burning stoves represent a severe fire hazard since the wood fuel therefore contains volatile substances which are normally not oxidized during combustion. These volatiles will burn if mixed with air at temperatures in excess of 590° C. However, the typical wood burning stove operates within a temperature range of between 230° and 370° C. At these temperatures, these volatile substances, known generally as cresote, remain unoxidized and tend to adhere to the flue pipes and are a cause of not infrequent chimney fires. Secondly, the incomplete combustion of the carbonaceous fuel in wood burning stoves leaves the unoxidized residue as a pollutant and an environmental hazard which is discharged to the atmosphere. Third, the unoxidized residue represents a loss of overall combustion efficiency. While claims have been made to efficiencies greater than 65% in some wood burning stoves, independent testing laboratories have determined that the combustion efficiency of typical wood burning stoves lies in the range of between 50 and 65%. One possible solution to the aforementioned problems is to increase the combustion temperature of the typical wood burning stove by providing additional air into the combustion chamber so as to create temperatures high enough to bring about complete combustion. Variations on this technique date back to the 18th century with the Franklin stove, wherein the volatiles are mixed with additional air in the combustion chamber in order that temperatures high enough to bring about complete combustion may be obtained. These efforts have only been partially successful.

OBJECTS OF THE INVENTION

It is an object of the present invention to provide an improved wood burning stove having increased safety resulting from the decreased possibility of chimney fires.

It is a further object of the present invention to provide an improved wood burning stove in which the unoxidized carbonaceous pollutants are minimized.

It is a still further object of the present invention to provide an improved wood burning stove having an increased fuel efficiency.

SUMMARY OF THE INVENTION

These and other objects of the present invention are achieved by the modification of a wood burning stove to include a particular catalytic converter means which reduces the reaction temperature sufficiently to remove the volatile smoke-producing substances at the ordinary operating temperatures of the stove from the exhaust or flue gases emanating from the combustion of wood or similar solid fuel in the stove. In accordance with the present invention, the catalytic converter means is located either in the combustion chamber of the wood burning stove or in the flue extending therefrom but in either case at a location wherein operating temperature is sufficiently high to sustain the catalytic oxidation, effected by the converter, of the volatiles contained in wood fuels.

In the preferred embodiment of the present invention, the catalytic converter means is situated in the flue emanating from a wood burning stove either as close as possible to or even partially within the combustion chamber of the stove.

In another embodiment of the present invention, a wood burning stove is provided with a primary combustion chamber and a secondary heat exchange chamber and with a communicating passageway therebetween. A catalytic converter means is situated in the passageway.

In still another embodiment of the present invention, the catalytic converter means is integral with or applied directly to the walls of the combustion chamber of the wood burning stove.

The particular catalytic converter means in the present invention comprises a honeycomb structure or cellular monolith having a plurality of mutually parallel catalytic cells, each having a length or flow-through axis oriented in the direction of the flow of the exhaust in or from the combustion chamber. However, it has been found that the nature and structure of the catalytic monolith, that is the cell density, length, inside cell dimension and volume, thereof, are critical. For example, in typical automotive applications, it has been found that catalytic converters having a cell density (in a plane perpendicular to to the axial direction of cells) of at least about 200 cells per square inch are desirable. However, in wood burning stoves, it has been found that catalytic cell densities of this magnitude may cause severe plugging and excessive back pressure, resulting in insufficient draft to operate the stove.

In wood burning stoves, it has been found that the external volume of the catalytic converter means has a marked effect on catalytic performance in relation to the volume of the firebox or primary combustion chamber of the stove (and correspondingly to the volume of wood or similar solid fuel burning therein and to the directly related rate of producing combustible gases by such burning). Specifically, it has been found that, for at least satisfactory performance in the smaller commercial stoves (e.g. with firebox volumes of about 1.5 to 2 cubic feet or so), the volume, V (in cubic inches), of the catalytic converter means (i.e. honeycomb structure), when expressed as a function of the cell density, N (in cells per square inch of transverse cross-section) of the honeycomb structure in a direction perpendicular to exhaust flow passages through the cells, should be at least:

$$V = \frac{1.35}{N^2} + \frac{400.34}{N} - 0.013.$$

For larger commercial stoves with firebox volumes of about 5 or so cubic feet, it has been found that performance provided by the cellular catalytic converter means is:

(1) marginally adequate where its volume is at least $$V = -\frac{3333.33}{N^2} + \frac{1537.50}{N} - 14.17;$$

(2) generally acceptable where its volume is at least $$V = -\frac{4458.33}{N^2} + \frac{1957.5}{N} + 3.83;$$

and (3) optimum where its volume is at least:

$$V = -\frac{6720.23}{N^2} + \frac{2554.85}{N} + 14.84.$$

Additionally, it has been found that for optimum pressure drop in a wood burning stove, the catalytic converter means employed should have a predetermined ratio of its length, L (in inches) to its density, N (in cells per square inch), volume, V (in cubic inches), and inside cell dimension, X (expressed in inches). Specifically, it has been found that:

$$\frac{L^2}{NVX^4} < 5$$

Still more specifically, it has been found that a catalytic converter means with a volume of 150 in.$^3$, a cell density of 16 cells/in$^2$, a length of 6 in. and an inside cell dimension of 0.21 in. is particularly preferred as to both its catalytic performance and the pressure drop thereacross.

Generally, the catalytic converter means of this invention should have a cell density substantially less than 200 cells/square inch and desirably in the range of about 9–50 cells/square inch, or even up to 100 cells/square inch.

DETAILED DESCRIPTION OF THE PREFERRED EMBODIMENT

Figure 1:
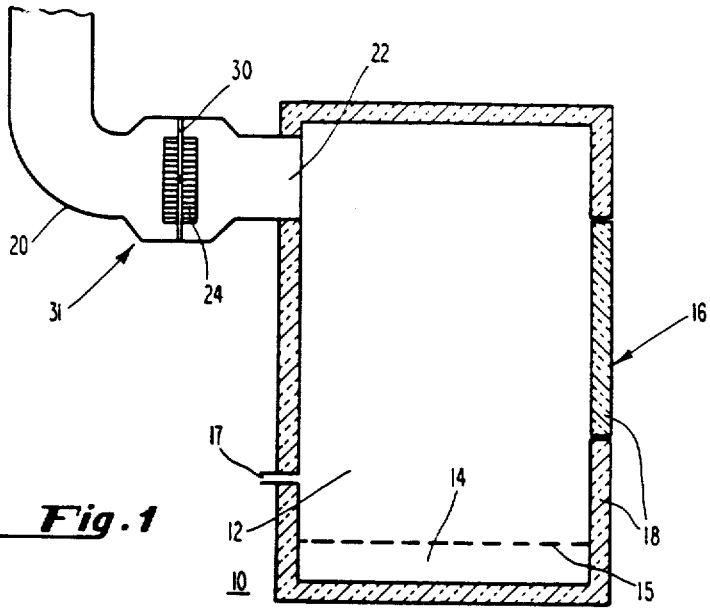
FIG. 1 is a cross-sectional schematic view of a wood burning stove employing a catalytic converter means in accordance with one embodiment of the present invention.

Referring now to FIG. 1 a cross-sectional view of a typical wood burning stove modified in accordance with one embodiment of the present invention will be described. A wood burning stove is shown generally at 10. The wood burning stove 10 includes a firebox or primary combustion chamber 12 situated above an ash pan 14 and separated therefrom by means of a gate 15. Access to the primary combustion chamber 12 for loading wood or similar solid fuel therein is by means of an entrance door or hatch covering an opening in a side (front) wall of the chamber, which is shown generally at 16. Suitable insulation 18 may surround the combustion chamber 12 including the interior surface of the hatch or door 16, although such insulation is not a requirement. A flue 20 communicates with the combustion chamber 12 by means of an exit port 22. A primary air inlet port 17 provides a source of oxygen for combustion within the primary combustion chamber 12. Wood or similar solid fuel is combusted in the primary combustion chamber 12 and exhaust gases emanating therefrom pass through exit port 22 to the flue 20 and from there to the outside environment. In accordance with one aspect of the present invention, a cellular catalytic converter means 24 is situated internal to the flue 20 immediately adjacent to the exit port 22 from the combustion chamber 12. In accordance with this aspect of the present invention, the catalytic converter means 24 is situated as close as possible to the combustion chamber 12, even extending in part into the combustion chamber 12 if the configuration of the exit port 22 permits such an installation. In any event, at most, the catalytic converter means 24 is situated at a position in the flue where converter inlet temperature are above 200° C. Generally, this position is no greater than 6 inches from the combustion chamber. The aforementioned insulation 18 is provided to ensure that at least some of the heat liberated from fuel being combusted in the combustion chamber 12 is utilized to heat the exhaust in the flue 20 sufficiently to cause light off of the converter 24 rather than being transferred through the walls of the wood burning stove 10.

The cellular catalytic converter means 24 is a ceramic honeycomb structure having a plurality of mutually parallel cells extending therethrough with a catalytic substance being applied to the walls thereof. Such catalytic converter means, corrugating the coated carrier, subsequently firing the ceramic and thereafter applying a catalyst thereto as set forth in U.S. Pat. No. 3,112,184-Hollenbach. Alternatively, the catalytic converter means may be formed by extrusion from a suitable die means as taught in U.S. Pat. No. 3,790,654-Bagley.

Since the catalytic converter means 24 may operate at temperatures of between 700° to 900° C. and since internal temperatures of the converter means 24 may at times reach 1100° C., it is desirable that the flue 20 have insulation (not shown) surrounding the same in the vicinity of the catalytic converter means 24.

Figure 5:
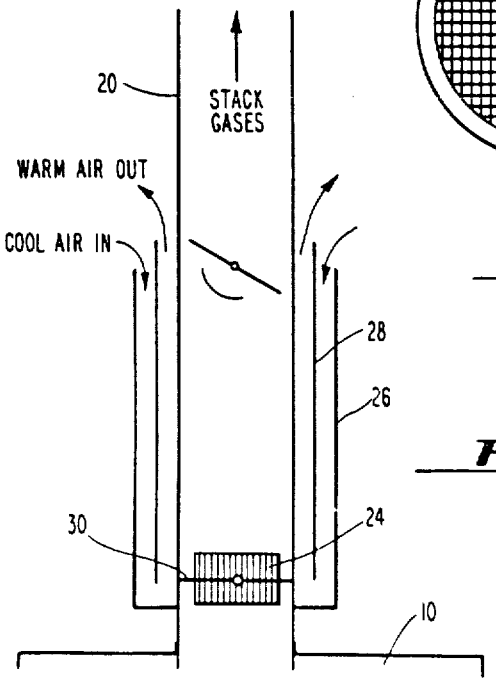
FIG. 5 is a detailed schematic view of an alternative embodiment of the mounting arrangement shown in FIGS. 2–3.

Alternatively, as shown in FIG. 5, it is desirable to provide the flue 20 with a shielding means comprising a first generally cylindrically shaped baffle 26 surrounding an internal cylindrical baffle 28. Cool air enters the space between the first baffle 26 and the second baffle 28 and passes in the vicinity of the catalytic converter means 24 and then exits in the space between the second baffle 28 and the flue 20. Such an installation not only shields the high temperatures of the catalytic converter means 24 from persons in the vicinity thereof, but also provides an additional source of heat transfer to the space being heated by the wood burning stove 10, thus increasing the combustion efficiency of the stove.

The mounting of the catalytic converter 24 within the flue 20 may be accomplished by situating the catalytic converter means 24 in a metal ring 30 which preferably is formed from stainless steel. At the time the stove is loaded with new or additional fuel, and the door 16 is opened, increased air flow into its combustion chamber 12 occurs and the presence of catalytic converter means 24 may cause an excess back pressure causing smoke to improperly exhaust. In such an instance, it is necessary that the oxidation products bypass the catalytic converter means.

Figure 2:
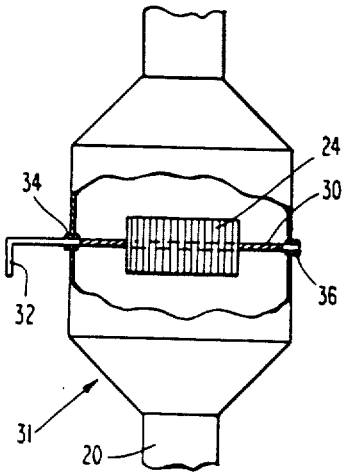
FIG. 2 is a detailed view of the mounting arrangement of the catalytic converter means shown in FIG. 1 in a first position.
Figure 3:
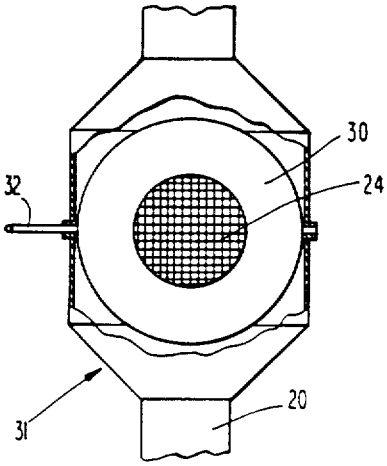
FIG. 3 is a detailed view of the catalytic converter means shown in FIG. 2, but rotated 90°.

Accordingly, in the embodiment shown in FIG. 1, it is desirable to mount the catalytic converter means 24 for rotation as shown specifically in FIGS. 2 and 3. There it will be seen that a handle 32 is provided which projects from the flue 20. The handle 32 is connected to the mounting plate 30 which supports the catalytic converter means 24. The mounting plate 30 is rotatably mounted within the flue by means of bushings 34 and 36. Rotation of the handle 32 causes rotation of the mounting plate 30 and ultimately of the catalytic converter means 24 so as to permit combustion gases to pass through the flue 20 without passing through the catalytic converter means 24 during those periods when excess back pressure may be encountered such as when the door 16 is open. As shown in FIGS. 1–3 in order to accommodate converters of different thickness or cell length, the area 31 in the flue 20 in which rotation occurs has a larger cross-sectional area than the remainder of the flue 20. Without such an arrangement, the converter means 24 would not have sufficient clearance for rotation within the flue 20 unless its cross-sectional area were less than that of the flue.

Figure 4A:
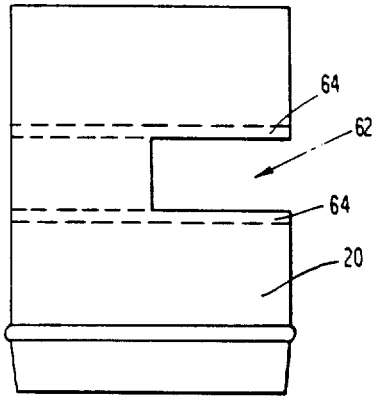
FIG. 4A is an elevational view of a flue for a wood burning stove having alternative mounting arrangement for a catalytic converter means, than that shown in FIGS. 2–3.
Figure 4B:
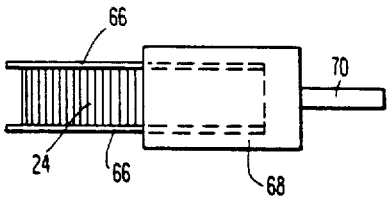
FIG. 4B is an elevational view of a catalytic converter means and mounting bracket therefor for use with the flue of FIG. 4A.
Figure 4C:
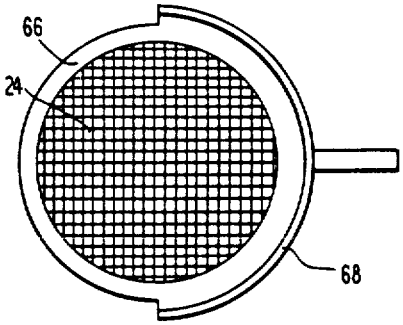
FIG. 4C is a top view of the converter means and mounting bracket shown in FIG. 4B.

Referring now to FIGS. 4A–4C, another mounting arrangement from that shown in FIGS. 2 and 3 will be described. Specifically, with respect to FIG. 4A, a portion of a flue 20 is shown having an opening 62 therein. The opening 62 extends at least 180° about the periphery of the flue. Parallel tracks 64 on the internal surface of the flue 20 are provided.

As shown in FIG. 4B, a catalytic converter means 24 is provided having annular mounting brackets 66 on the top and bottom surfaces thereof, the brackets 66 preferably being formed from stainless steel. The brackets 66 are spaced so as to mate with tracks 64 such that the catalytic converter means 24 may be slidably engaged within the flue 20. The brackets 66 are joined to a shielding means 68 having a suitable handle 70, such that the catalytic converter means 24 may be selectively placed in the flue 20, with the shield 68 providing a closure to the opening 62. The converter means 24 may also be at least partially removed from the flue 20 when new or additional fuel is added to the combustion chamber 12, thus eliminating excess back pressure. An additional shielding means similar to that shown at 68 may also be provided which is not associated with a catalytic converter means for closing opening 62 when new or additional fuel is added to the combustion chamber so that smoke does not exit from this opening.

The provision of a catalytic converter means 24 on a movable mount such as that shown in FIGS. 2, 3 and 4A–4C is described and claimed in the aforementioned application of Allaire and Van Dewoestine, Ser. No. 173,156.

Figure 6:
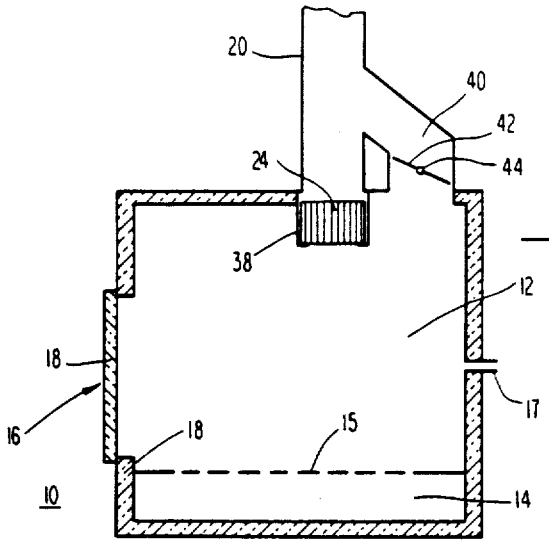
FIG. 6 is a sectional schematic view of a wood burning stove employing a catalytic converter means mounted in accordance with another embodiment of the present invention.

Referring now to FIG. 6, still another embodiment of the present invention is disclosed wherein like numerals are utilized to describe features common to the embodiment shown in FIGS. 1–3. In the embodiment shown in FIG. 6, a wood burning stove 10 is shown having a primary combustion chamber 12 with an ash pan 14. A grate 15 provides a support for the location of wood fuel to be combusted within the primary combustion chamber 12. Wood fuel is introduced within the primary combustion chamber 12 by means of a door or hatch 16. Insulation 18 may be situated within the interior of the combustion chamber 12. Moreover, in accordance with the embodiment shown in FIG. 6, a catalytic converter means 24 is provided which is located within the primary combustion chamber. The insulation 18 is provided to ensure that some of the heat liberated in the combustion chamber 12 is utilized for light off of the catalytic converter means 24. The catalytic converter means 24 is retained within a bracket 38, preferably made from stainless steel. Combustion products from the primary combustion chamber 12 exit therefrom by passing through the catalytic converter means 24 and thereafter exiting by means of the flue 20 to external environment.

In accordance with aforementioned application of Allaire, et al., Ser. No. 173,157, in the embodiment shown in FIG. 6, a bypass passageway 40 is provided which communicates with the interior of the combustion chamber 12 of the wood burning stove 10. Access to the bypass passageway 40 is controlled by means of a bypass damper 42 which is rotatable about an axis 44 so as to allow combustion gases to bypass the catalytic converter means 24 during those periods in which an excess back pressures is expected such as when wood fuel is added to the combustion chamber 12.

Figure 7:
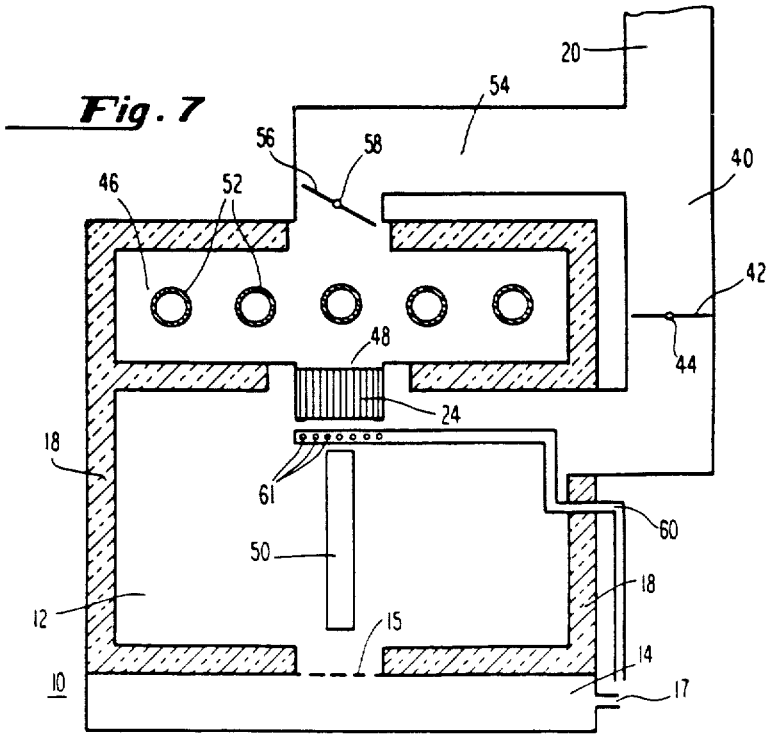
FIG. 7 is a cross-sectional schematic view of a wood burning stove employing a catalytic converter means mounted in accordance with a third embodiment of the present invention.

Referring not to FIG. 7, still another embodiment of the present invention is disclosed, again with like numerals referring to items common to those shown in the embodiments of FIGS. 1 and 5. FIG. 7 discloses a wood burning stove 10 having a primary combustion chamber 12 wherein wood fuel is combusted. Wood fuel is placed in the primary combustion chamber 12 by means of a door or hatch (not shown). Communication between the primary combustion chamber 12 and the ash pan 14 is by way of a grate 15 as shown. Air for combustion enters the primary combustion chamber 12 by means of a primary air inlet 17 and by means of grate 15. The primary combustion chamber 12 is preferably insulated to provide sufficient heat for light off of the converter means 24. Unlike the embodiments shown in FIGS. 1 and 6, in addition to the provision of a primary combustion chamber 12, the embodiment shown in FIG. 7 also includes a heat exchange chamber 46 interconnected by means of an opening 48 to the primary combustion chamber 12. Situated in or adjacent to the opening 48 is a catalytic converter means 24. Combustion gases from the combustion chamber 12 are directed by means of a flow director or vane 50 to the catalytic converter means and catalyzed combustion gases are then passed through the heat exchanger chamber 46 in the vicinity of a heat exchanger comprising a serpentine series of pipes or tubes 52. The combustion gases are then directed to the flue 20 by means of a communicating passaway 54. Entrance to the communicating passageway 54 is controlled by means of a damper 56 which is rotatable about an axis 58.

Like the embodiment shown in FIG. 6, the wood burning stove 10 shown in FIG. 7 also includes a bypass passageway 40 controlled by a bypass damper 42 rotatable about an axis 44 whereby combustion gases may be caused to bypass the catalytic converter means 24 when excess back pressure is expected such as during loading of additional fuel.

In the embodiment shown in FIG. 7, a secondary air inlet 60 is provided such that additional oxygen may be provided to the vicinity of the catalytic converter means 24 for sufficient operation thereof. The secondary air inlet 60 preferably comprises a tube, one end of which contains apertures 61 in the vicinity of the converter means 24, and the other end terminating in the vicinity of the primary air inlet 17.

With respect to each of the embodiments shown in the foregoing figures, it has been determined that the nature and structure of the catalytic converter means 24 which is employed is important. The catalytic converter means 24 employed preferably includes a ceramic monolith having an alumina washcoat applied thereto and coated with precious metal catalysts such as palladium, platinum or alloys of the two in amounts ranging from, for example, 13 grams per cubic foot to 57 grams per cubic foot. However, regardless of the catalysts selected or the loading thereof, the length, volume, and wall thickness of the catalytic monolith selected as well as the density of the catalytic cells employed are critical for adequate creosote removal without excessive back pressure.

Specifically, it has been determined that for adequate performance, i.e., prevention of creosote accumulation as well as for improvement of combustion efficiency, the volume of the converter means as well as the cell density thereof must be controlled. Catalytic performance may be considered optimum if no cresote accumulation is detected and if no detectable unoxidized residue is discharged in the flue. Catalytic performance may, however, still be acceptable if no creosote is formed even though a small quantity of unoxidized residue may be detected. Finally, performance may be considered marginal if most but not all creosote is eliminated from the flue even if considerable unburned material passes through the flue. Specifically, it has been determined that the performances attained with cellular catalytic converter means in the exhaust path of a stove having a firebox volume of about 5 cubic feet are as shown in Table I where the dimensions are those of the entire converter honeycomb structure.

TABLE I

| Performance | Volume V ($in^3$) | Diameter D (in) | Length L (in) | Density N ($cells/in^2$) |
|---|---|---|---|---|
| Optimum | 150 | 5.66 | 6 | 16 |
| Acceptable | 150 | 5.66 | 6 | 9 |
| Acceptable | 75 | 5.66 | 3 | 25 |
| Marginal | 75 | 5.66 | 3 | 16 |
| Marginal | 50 | 5.66 | 2 | 25 |
| Unacceptable | 75 | 5.66 | 3 | 9 |

Satisfactory or acceptable performance was also obtained in a smaller stove with a 1.6 cubic foot firebox and a cellular catalytic converter having a $3.5\times4\times3$ inch external size and a cell density of 16 $cells/in^2$.

From the forgoing data it has been determined that catalytic performance is related to volumes and cell density by the following relationships:

As minimum criteria for the present invention and for acceptable performance at least in smaller volume firebox stoves, volume, V in cubic inches, of the converter, expressed as a function of cell density, N expressed in terms of cells per square inch, should be at least:

$$V=1.35/N^2+400.34/N-0.013.$$

For optimum performance in larger volume firebox stoves, volume, V in cubic inches, of the converter, expressed as a function of cell density, N expressed in terms of cells per square inch, should be at least:

$$V=-6720.23/N^2+2554.85/N+14.84.$$

For acceptable performance in larger volume firebox stoves, volume, V, of the converter, expressed as a function of cell density, N, should be at least:

$$V=-4458.55/N^2+1957.5/N+8.83.$$

For marginal performance in larger volume firebox stoves, volume, V, of the converter, expressed as a function of cell density, N, should be at least:

$$V=-333.33/N^2+1537.5/N-14.17.$$

Based on the guidance of foregoing formulas and exemplary performance data, those of ordinary skill in the art can readily select a cellular catalytic converter of suitable overall volume and cell density for desired performance in a stove with any particular firebox volume.

Moreover, even if a particular catalytic converter means has optimum, acceptable or marginal performance as defined above, it has been determined that the converter means must additionally exhibit a suitable pressure drop across it for adequate stove operation, since, as cell density is increased to improve catalytic performance, the pressure drop across the converter may be too great to sustain combustion in the stove.

The pressure drop through a square cell catalytic converter is defined as:

$$\Delta P = m\frac{\mu}{\rho}\,28.4L\,\frac{4}{\pi D^2}\,\frac{(X+T)^2}{X^4}$$

where:

$\Delta p$=pressure drop
m=mass flow rate of gases
$\mu$=gas viscosity
$\rho$=gas density
L=converter length
D=converter diameter
X=inside cell dimension
T=wall thickness This form can be modified to give:

$$\Delta P = m\frac{\mu}{\rho}\,56.8\,\frac{L^2}{NVX^4}$$

where:

L=converter length
N=cell density
V=converter volume
X=inside cell dimension

All the terms which are constant can be moved to the left side of the equation and accordingly:

$$\frac{\Delta P\rho}{56.8m\mu} = \frac{L^2}{NVX^4} = K\ \text{(constant)}$$

It has been determined that pressure drop may be considered optimum where K is less than 5. In such a situation, the pressure drop across the catalytic converter means is generally not noticeable. An acceptable pressure drop may still be had where K is greater than or equal to five but less than seven. In such a situation, pressure drop is noticeable, however, there are generally no adverse effects. In the situation where K is greater than or equal to seven but less than 10, a significant pressure drop occurs across the catalytic converter means and the usefulness of a particular catalytic converter means will depend on the particular wood burning stove with which it is utilized. Finally, it is believed that when K is greater than or equal to 10 excessive pressure drop across the converter occurs, such that combustion may not be sustained. As may be seen from the data set forth in Table II, the following catalytic converter means were tested for pressure drop thereacross.

TABLE II

| K | L (in) | N (cells/in$^2$) | V (in$^3$) | X (in) |
|---|---|---|---|---|
| 2.40 | 3 | 9 | 75 | 0.273 |
| 4.80 | 6 | 9 | 150 | 0.273 |
| 3.86 | 3 | 16 | 75 | 0.210 |
| 7.71 | 6 | 16 | 150 | 0.210 |
| 4.32 | 2 | 25 | 50 | 0.165 |
| 6.48 | 3 | 25 | 75 | 0.165 |

While particular embodiments of the present invention have been shown and described, other modifications of the invention not specifically mentioned above which will occur to those skilled in the art are intended to be included within the scope of the appended claims. It will also be appreciated by those skilled in the art that wood burning stoves are of a type that may also burn similar solid fuel such as charcoal and coal.

What is claimed is:

[1. In a woodburning stove of the type having:
a combustion chamber, and
a flue for removing exhaust from said chamber, the improvement comprising:
a catalytic converter means for oxidizing oxidizable species in said exhaust, said catalytic converter means comprising a honeycomb structure having a plurality of mutually parallel catalytic cells, each having a flow length oriented in the direction of the flow of said exhaust, and a volume (V) in cubic inches expressed as a function of the cell density (N) of said cells in cells per square inch in a direction perpendicular to said flow being at least:]

$$[V = \frac{1.35}{2} + \frac{400.34}{N} - 0.013.]$$

[2. The stove of claim 1 wherein said catalytic converter means is situated in said flue immediately adjacent said chamber.]

[3. The stove of claim 1 wherein said flue communicates with said combustion chamber at an exit port and wherein said catalytic converter means is situated in said chamber at said exit port.]

[4. The stove of claim 1 wherein said catalytic converter is situated in said combustion chamber.]

[5. The stove of claim 1 further comprising:
a heat exchange chamber in communication with said flue, and
an opening interconnecting said combustion and heat exchange chambers, said catalytic converter means being situated adjacent said opening.]

[6. The stove of claim 1 wherein said oxidizable species is creosote.]

7. [The stove of claim 1 wherein said volume in cubic inches is at least:] *In a woodburning stove of the type having: a combustion chamber, and a flue for removing exhaust from said chamber, the improvement comprising: a catalytic converter means for oxidizing oxidizable species in said exhaust, said catalytic converter means comprising a honeycomb structure having a plurality of mutually parallel catalytic cells, each having a flow length oriented in the direction of the flow of said exhaust, and a volume (V) in cubic inches expressed as a function of the cell density (N) of said cells in cells per square inch in a direction perpendicular to said flow being at least:*

$$V = -\frac{3333.33}{N^2} + \frac{1537.5}{N} - 14.17.$$

8. The stove of claim [1] *7* wherein said volume in cubic inches is at least:

$$V = -\frac{4458.33}{N^2} + \frac{1957.5}{N} + 3.83.$$

9. The stove of claim [1] *7* wherein said volume in cubic inches is at least:

$$V = -\frac{6720.23}{2} + \frac{2554.85}{N} + 14.84.$$

[10. The stove of claim 1 wherein the cell density is substantially less than 200 cells/square inch.]

[11. The stove of claim 1 wherein the cell density is in the range of about 9–100 cells/square inch.]

[12. The stove of claim 1 wherein the cell density is in the range of about 9–50 cells/square inch.]

13. The stove of [claim 1] *any of claims 7–9, 19–20 or 24* wherein the cell density is in the range of 9–25 cells/square inch.

14. The [stoves] *stove* of [claim 1, 7, 8 or 9] *claims 7–9, 19–20 or 24* wherein the square of the length of said cells divided by the product of the cell density times the converter volume times the fourth power of the insides dimension of one of said cells is less than 5.

15. The [stoves] *stove*] of [claim 1, 7, 8, or 9] *any of claims 7–9, 19–20 or 24* wherein the square of the length of said cells divided by the product of the cell density times the converter volume times the fourth power of the inside dimension of one of said cells is less than 7.

16. The [stoves] *stove* of [claim 1, 7, 8 or 9] *any of claims 7–9, 19–20 or 24* wherein the square of the length of said cells divided by the product of the cell density times the converter volume times the fourth power of the inside dimension of one of said cells is less than 10.

*17. The stove of claim 7 wherein said volume in cubic inches is less than:*

$$V = -\frac{4458.33}{N^2} + \frac{1957.5}{N} + 3.83.$$

*18. The stove of claim 8 wherein said volume in cubic inches is less than:*

$$V = -\frac{6720.23}{N^2} + \frac{2554.85}{N} + 14.84$$

*19. In a woodburning stove of the type having:*

*a combustion chamber, and a flue for removing exhaust gas from said chamber, the improvement comprising:*

*a ceramic catalytic converter for oxidizing oxidizable species in said exhaust, located in said woodburning stove, at a location wherein the temperature produced by heat liberated from fuel being combusted in said combustion chamber is sufficiently high to light off and sustain the catalytic oxidation of the volatiles in the exhaust, free of any external source of heat other than heat liberated from fuel being combusted in said combustion chamber.*

*20. The stove of claim 19 in which said catalytic converter comprises:*

*a plurality of catalytic cells each having a length oriented in the direction of the flow of said exhaust.*

*21. The stove of claim 19 or 20 in which said converter's resistance to flow is such that the pressure drop across the converter does not prevent combustion in the stove.*

*22. In a woodburning stove of the type having a combustion chamber and,*

*a flue for removing exhaust from said chamber, the improvement comprising:*

*catalytic converter means for oxidizing oxidizable species in said exhaust, said catalytic converter means having a volume of at least about 50 cubic inches and a cell density of at least about 9 cells per square inch.*

*23. The stove of claims 7–9, 19–20 or 22 in which, said catalytic converter means is located within said stove at a location wherein the temperature produced by heat liberated from fuel being combusted in said combustion chamber is sufficiently high to light off and sustain the catalytic oxidation of the volatiles in the exhaust.*

*24. The stove of claim 25 in which said converter means comprises:*

*a plurality of catalytic cells, each having a length oriented in the direction of the flow of said exhaust.*

*25. The stove of claim 23 in which the resistance to flow of said converter means is such that the pressure drop across the converter means does not prevent combustion in the stove.*

*26. The stove of claim 23, wherein said catalytic converter means is located in said combustion chamber.*

*27. The stove of claim 23, wherein said catalytic converter means is located in said flue.*

*28. A woodburning stove, comprising:*

*a combustion chamber adapted for the burning of wood fuel to produce heat and exhaust;*

*a flue communicating with said combustion chamber for removing exhaust therefrom; and*

*catalytic converter means for oxidizing oxidizable species in said exhaust, said catalytic converter means comprising a honeycomb structure having a multiplicity of mutually parallel catalytic cells for allowing exhaust from said combustion chamber to pass through said catalytic converter, said catalytic converter means having means for preventing creosote accumulation in said catalytic converter means and said flue during combustion of wood in said combustion chamber.*

*29. The stove of claim 28, wherein said catalytic converter means further comprises:*

*means for preventing discharge of detectable amounts of unoxidized residue into said flue.*

*30. The stove of any of claims 7, 19, 22 or 30 wherein said catalytic converter means comprises:*

*a ceramic monolith having an alumina washcoat applied thereto and coated with a catalyst consisting essentially of precious metal selected from the group consisting of palladium, platinum, and palladium-platinum alloys.*

*31. The stove of claim 30, wherein said catalytic converter means is coated with 13 to 57 grams per cubic foot of said precious metal.*

*32. The stove of claims 7, 19, 22 or 28, further comprising:*

*a plurality of walls defining said combustion chamber therebetween, heat of combustion from said combustion chamber being transferred through said walls to heat the surrounding air; and an air inlet port penetrating one of said walls for supplying air to said combustion chamber.*

*33. The stove of claim 32, further comprising:*

*insulation means surrounding said combustion chamber for causing a portion of the heat liberated in said combustion chamber to heat the exhaust in said flue sufficiently to light off said catalytic converter, the balance of the heat liberated in said combustion chamber being transferred through said walls.*

*34. The stove of claim 32, further comprising:*

*a grate disposed within said combustion chamber and adapted to support wood for combustion thereon.*

*35. The stove of claim 34, further comprising:*

*an ash pan for collecting ash which falls through said grate; and*

*a door built into one of said walls having means for allowing wood to be loaded on said grate and means for allowing said ash pan to be inserted into and removed from said combustion chamber.*

* * * * *